United States Patent [19]
Wolff et al.

[11] Patent Number: 5,810,458
[45] Date of Patent: Sep. 22, 1998

[54] LOCKER DOOR RETROFIT ASSEMBLY

[75] Inventors: John C. Wolff, Columbus; Scott R. Gardner, Dublin; Delbert P. Keisling, Jr., Clarks Summit; Kevin T. Burt, Columbus, all of Ohio

[73] Assignee: Compression Polymers Group, Moosic, Pa.

[21] Appl. No.: 754,496

[22] Filed: Nov. 20, 1996

Related U.S. Application Data

[63] Continuation-in-part of Ser. No. 356,490, Dec. 15, 1994, Pat. No. 5,595,426, which is a continuation-in-part of Ser. No. 196,660, Feb. 10, 1994, Pat. No. 5,564,806.

[51] Int. Cl.⁶ .............................. A47B 87/02; E04B 1/343
[52] U.S. Cl. .......................... 312/109; 312/108; 312/263; 312/140
[58] Field of Search ....................... 312/109, 108, 312/100, 102, 111, 263, 309.1, 329, 140, 215, 138.1, 205.5; 403/382, 403, 231; 52/799.1, 506.01, 483.1, 281, 264

[56] References Cited

U.S. PATENT DOCUMENTS

| | | | |
|---|---|---|---|
| 449,936 | 4/1891 | Jackson | 312/138.1 X |
| 726,555 | 4/1903 | Churchill | 312/108 X |
| 1,450,180 | 4/1923 | Jamison | 312/138.1 X |
| 2,727,800 | 12/1955 | Snider | 312/108 X |
| 2,902,328 | 9/1959 | Auer | 312/108 |
| 3,133,772 | 5/1964 | Brandes et al. | 312/108 |
| 3,710,736 | 1/1973 | Biondi et al. | 312/216 X |
| 4,289,363 | 9/1981 | Andersson et al. | 312/257.1 |
| 4,447,099 | 5/1984 | French et al. | 312/257.1 |
| 4,579,400 | 4/1986 | French | 312/257.1 |
| 4,753,495 | 6/1988 | Swink | 312/213 X |
| 5,310,254 | 5/1994 | Dallaire | 312/312 |
| 5,372,415 | 12/1994 | Tisbo et al. | 312/108 |

FOREIGN PATENT DOCUMENTS

| | | | |
|---|---|---|---|
| 412032 | 6/1934 | United Kingdom | 312/263 |

OTHER PUBLICATIONS

"The Solid Plastic Locker Solution", Advertisement—Lenox Locker Company, 1992.

*Primary Examiner*—Randolph A. Reese
*Assistant Examiner*—Robert J. Sandy
*Attorney, Agent, or Firm*—Standley & Gilcrest

[57] ABSTRACT

A locker door retrofit assembly is disclosed which is adapted for replacing door assemblies on metallic or other lockers with a plastic door assembly. The locker door retrofit assembly may include a plastic jamb hinge that covers the existing hinge and a door assembly. The retrofit locker assembly may be assembled off-site and attached to the existing locker assembly as one unit.

21 Claims, 9 Drawing Sheets

LOCKER DOOR RETROFIT ASSEMBLY

CROSS REFERENCE TO RELATED APPLICATIONS

The present application is a continuation-in-part of application for U.S. patent application Ser. No. 08/356,490, filed Dec. 15, 1994, now U.S. Pat. No. 5,595,426, which is a continuation-in-part of application for U.S. patent application Ser. No. 08/196,660, filed Feb. 10, 1994 (now issued U.S. Pat. No. 5,564,806).

BACKGROUND AND SUMMARY OF THE INVENTION

The present invention relates generally to lockers and more particularly to locker door retrofit assemblies. The present invention is designed to replace existing metallic doors or other assemblies with a locker door assembly comprised of a more suitable material.

Lockers for storing clothing, articles of merchandise, etc., are commonly constructed. Storage lockers are found in many different settings. For example, athletic facilities have lockers to allow athletes to store their possessions while participating in athletic events. Community swimming pools typically have lockers for storing street clothes while a person swims. Lockers are also found in industry where they are used for several purposes, such as the storage of equipment, work clothes, chemicals, and other items which are preferably kept in such a concealed environment when not in use. Lockers are also commonly found in airports, hospitals, school hallways, prisons, and many other sites too numerous to mention.

Most commonly steel sheet metal is used as a primary construction material with metal fasteners used to assemble the finished locker. Metallic lockers suffer from several disadvantages. They are easily damaged or marred such as by dents, scratches and graffiti. Moreover, the metal is subject to damage from rust, odors, delamination and fading.

Attempts have been made to solve the above-mentioned problems by wholly replacing these metallic lockers with plastic or wood lockers. Some storage lockers were built into either an existing wall of a building or into a building wall while under construction. These in-wall lockers may be expensive to replace with plastic lockers. These problems prevent many from taking advantage of the properties that plastic offers over steel sheet metal.

A need exists for a locker that is designed to overcome the aforementioned disadvantages. The present invention is a locker door retrofit assembly comprised of a material designed to overcome the above disadvantages, such as a plastic or a composite material. The following disclosure describes a plastic locker door retrofit assembly. However, it must be understood that any non-metal material that exhibits the desired characteristics may be utilized for the present invention.

In the present invention existing metallic doors and metallic jams or doors of other materials, such as wood, may be replaced with the plastic locker door assembly. Due to the plastic construction of the door assembly, the locker face will be resistant to many forms of abuse that lockers commonly receive. The locker doors will not dent as will metal lockers. In one embodiment, the locker door of the present invention will maintain its color throughout its entire cross-section. Due to the preferred homogeneous nature of the plastic door assembly, the lockers of the present invention will not delaminate. Furthermore, most materials used in the application of graffiti are readily removed from plastic panels to return the locker doors to their original surface appearance. The remaining metallic body of the locker system is hidden behind the plastic face and is thus protected. Moreover, the substitution with a plastic door assembly provides many cosmetic and aesthetically pleasing attributes to the locker system. These plastic lockers may carry almost any color scheme desirable. Colors may be chosen to match the surrounding decor, to provide a color coding scheme and/or to provide a medium for an organizational theme.

Additionally, the present invention may provide for a complete retrofit locker assembly which may be assembled off-site. The retrofit assembly may be shipped as one complete part and expeditiously attached to the old locker frame on-site. Accordingly, the locker assembly may be manufactured and assembled in a quality controlled factory environment which results in high quality, structurally sound, and consistent assemblies. Accordingly, the locker assemblies of the present invention may be installed on-site in a relatively short time while maintaining structural integrity and consistency.

Other features and advantages of the present invention will be apparent from the following description and claims and are illustrated in the accompanying drawings which show preferred features of the present invention and the principles thereof.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF THE PREFERRED EMBODIMENT

Figure 1:
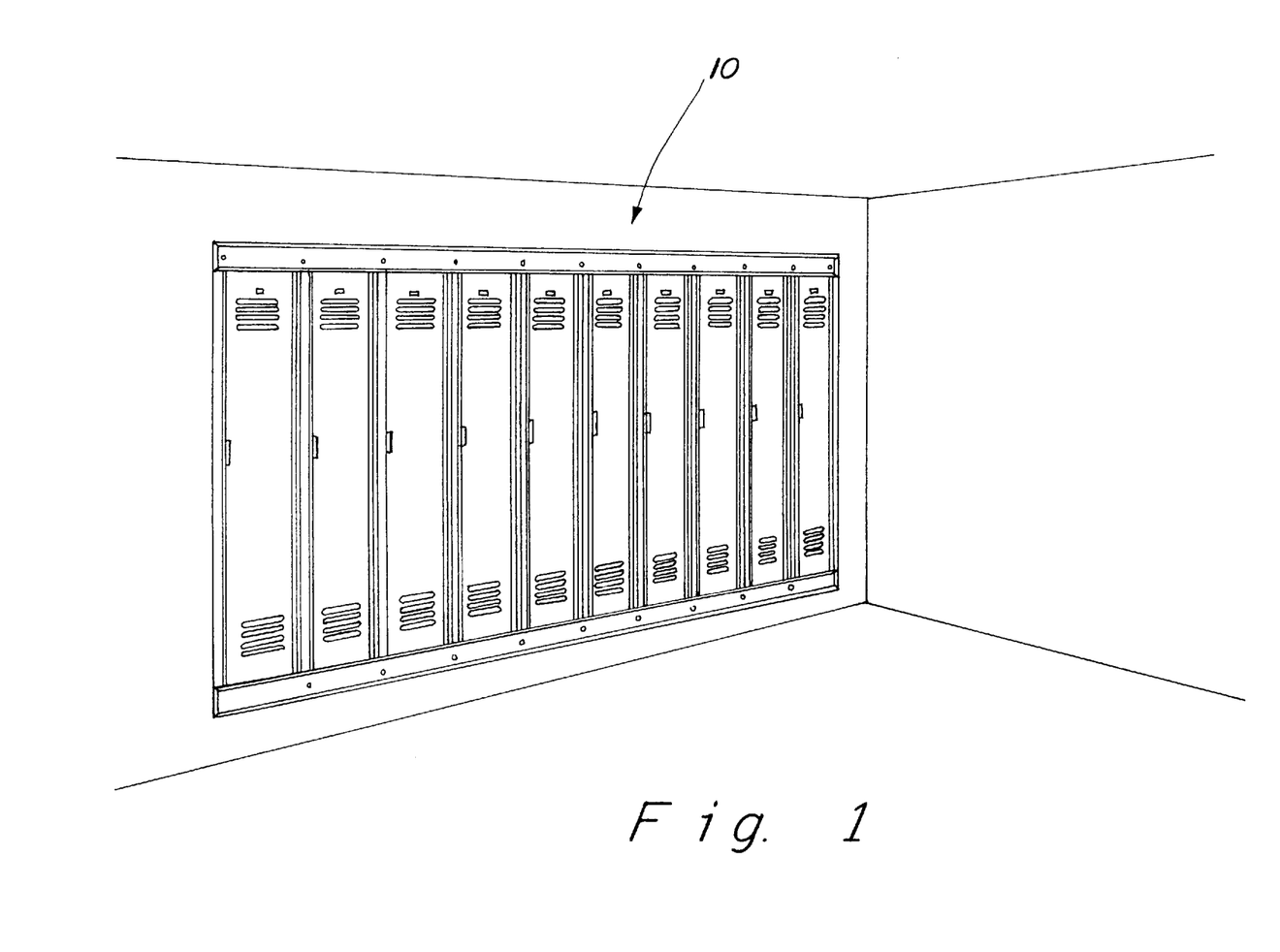
FIG. 1 is a perspective view of one embodiment of the installed locker door retrofit assembly of the present invention on an in-wall locker system.

Referring now to the drawings, FIG. 1 shows one embodiment of the present invention installed on an in-wall locker system shown generally at 10. The following description and accompanying figures disclose a locker door assembly with a right-hand opening. It must be understood that the present invention also encompasses left-hand openings and that the knowledge to provide left-hand versus right hand openings, from the disclosure provided herein, would be readily apparent. Although existing metal lockers are well suited for retrofit with the present invention, lockers made of other materials would likewise benefit from the present invention.

Figure 2:
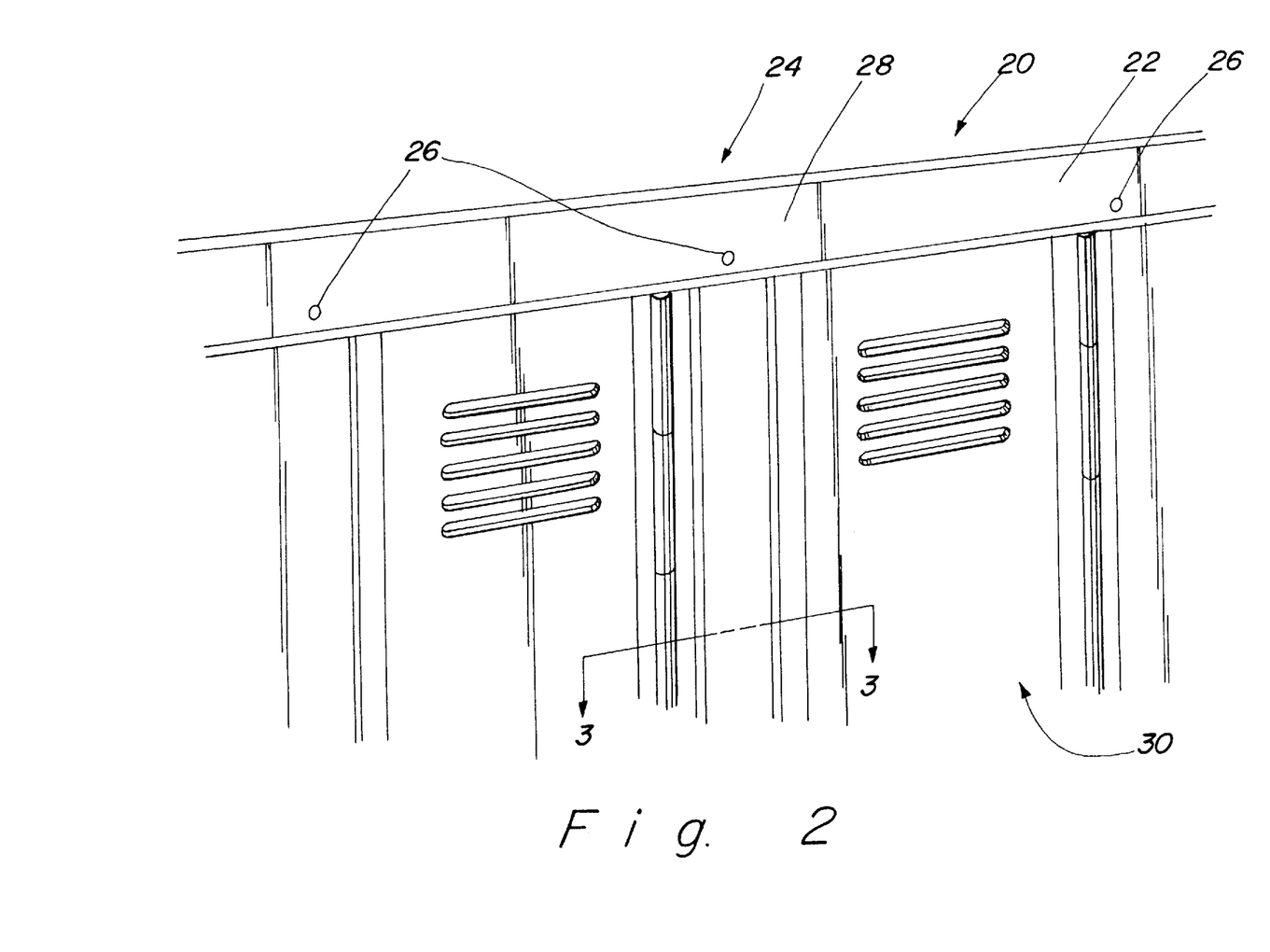
FIG. 2 is a detail view of the trim along the top of the locker door retrofit assembly shown in FIG. 1.

FIG. 2 shows generally the trim at the top of the plastic locker door at 20. A long strip of material 22 is fastened to wall 24 with fasteners shown generally at 26 to form the top trim 28. Top trim 28 serves to cosmetically and mechanically smooth the transition from the locker retrofit assembly 30 to the building walls 24. Fasteners, shown generally at 26, in the preferred embodiment include countersunk screws with matching caps, but any method of fastening the trim 28 to the wall 24 may be used.

Figure 3:
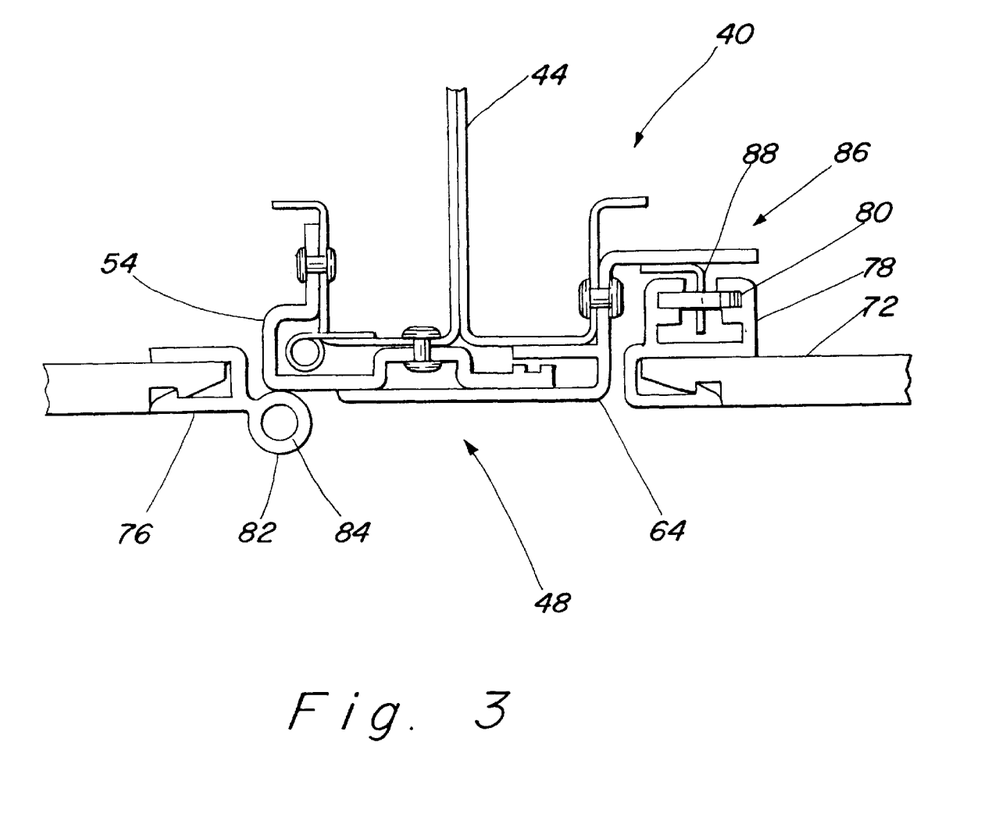
FIG. 3 is a section view taken along line 3—3 of FIG. 2.

FIG. 3 shows a section view of one embodiment of the locker door retrofit assembly installed on an in-wall locker system at 40. The section of wall allows a view of the top of the existing metallic in-wall portions of a locker system at 44. The interface between the locker door retrofit assembly 30 and the in-wall locker system at 44 can be viewed at 48.

Figure 4:
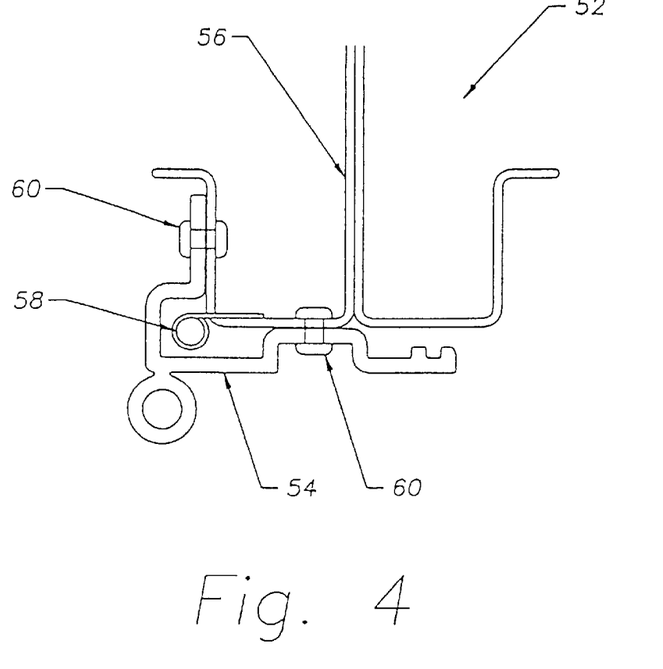
FIG. 4 is a top plan view of the door hinge of one embodiment of the present invention attached to the metallic locker wall.
Figure 5:
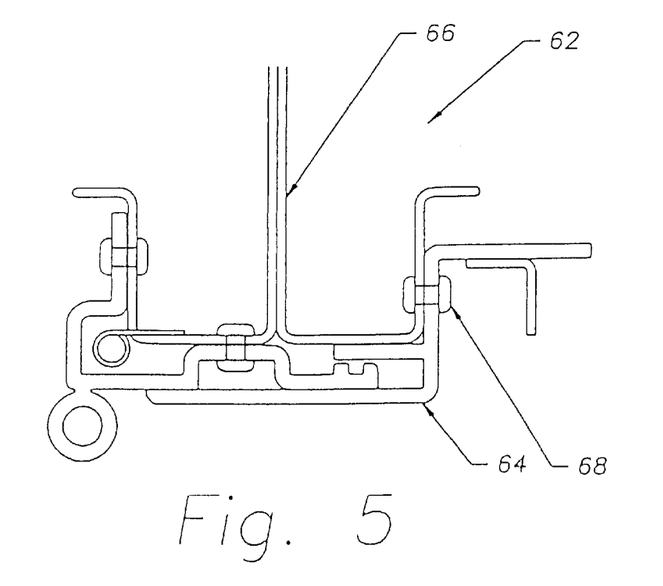
FIG. 5 is a top plan view of one embodiment of the jamb of the present invention attached to the metallic wall.
Figure 6:
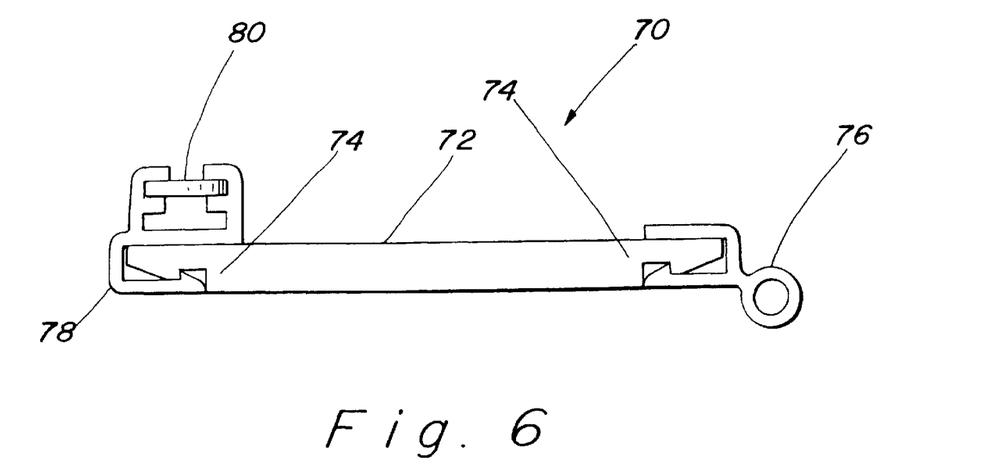
FIG. 6 is a plan view of the door of one embodiment of the present invention.
Figure 7:
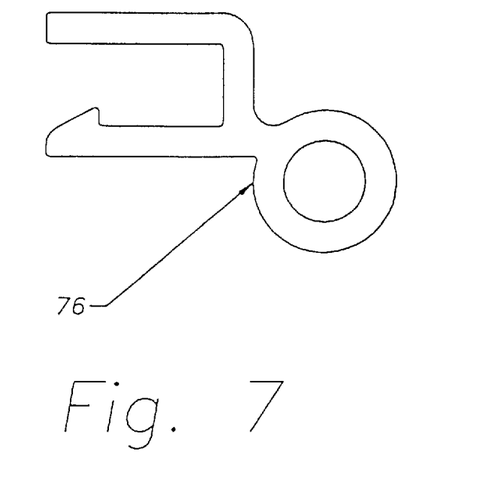
FIG. 7 is a detailed plan view of the door hinge of one embodiment of the present invention.
Figure 8:
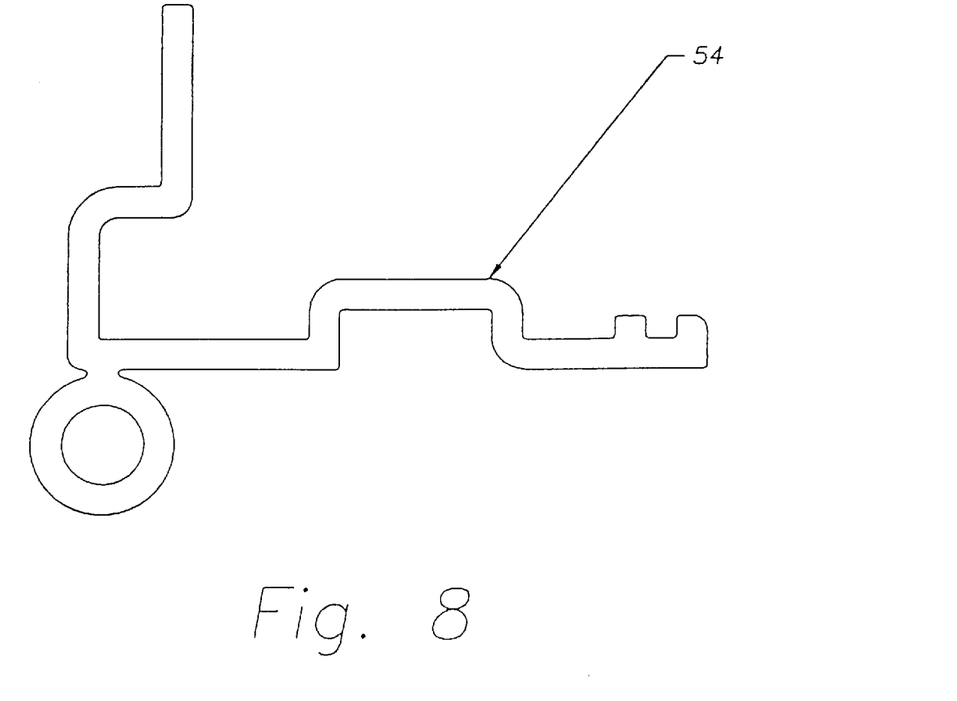
FIG. 8 is a detailed plan view of the jamb hinge of one embodiment of the present invention.
Figure 9:
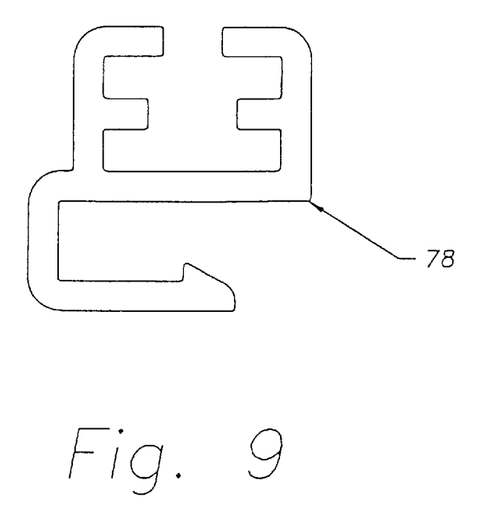
FIG. 9 is a detailed plan view of the door lock of one embodiment of the present invention.
Figure 10:
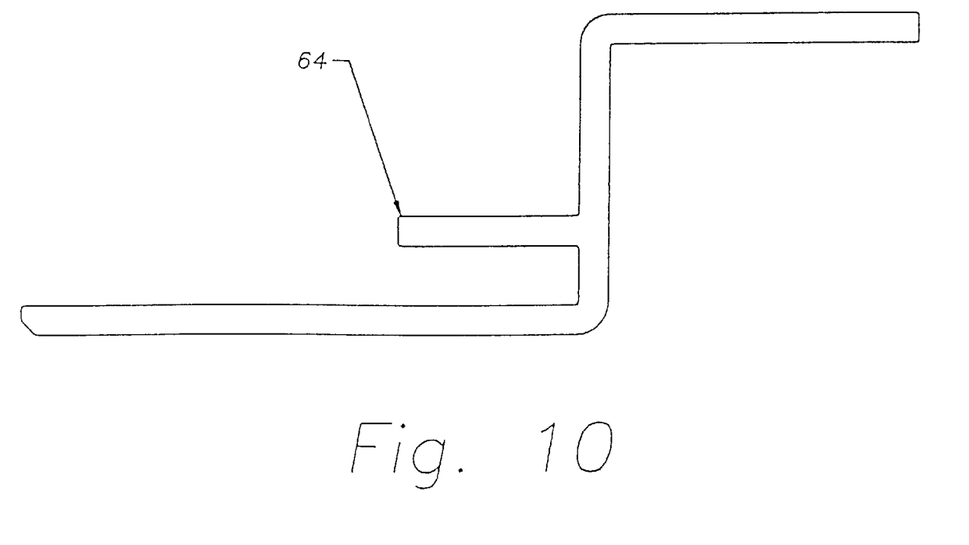
FIG. 10 is a detailed plan view of the jamb lock of one embodiment of the present invention.

For a detailed description of one embodiment of the assembly of this interface refer to FIGS. 4, 5 and 6. FIG. 4 shows the installation of the jamb hinge on the in-wall locker at 52. Jamb hinge 54 may be placed against the right-sidewall of the in-wall locker at 56. Note, the configuration of the jamb hinge 54 allows open space to accommodate the existing hinge of the in-wall locker at 58, if so desired. Jamb hinge 54 is attached to the in-wall locker 56 with fasteners shown generally at 60.

Referring now to FIG. 5, installation of the jamb lock is shown generally at 62. Jamb lock 64 is placed against the left-sidewall of the in-wall locker 66 and fastened thereto with a fastener shown generally at 68. The jamb lock 64 is preferably adapted to be slidably adjustable in relation to the jamb hinge 54, prior to securing the jamb lock 64 to the side wall, thereby allowing the jamb lock 64 and the jamb hinge 54 to fit on adjacent lockers of variable dimensions.

Referring now to FIG. 6, one embodiment of the assembly of the door is shown generally at 70. A door panel is shown at 72 and is configured to receive side attachments at 74. A door hinge is shown at 74 that may snap into a locking relationship with door panel 72 at 74. A door lock, shown at 78, snaps into a locking relationship with the door panel 72 at 74. The door lock 78 may also include a door latch bar 80.

Referring back to FIG. 3, the installation of the door is shown at 40. The door hinge 76 is mated with the jamb hinge 54 at 82 and is locked by rod 84 into a hinging relationship. Note, the preferred locking relationship between the jamb lock 64 with the door 72 at 86, when the locker door is in a closed position as shown. The door lock 78 of the door 72 allows the door latch bar 80 to engage the latch 88 of the jamb lock 64. The door latch bar 80 is preferably in a sliding relationship with the door lock 78 for engaging the jamb lock 64 when the door is in a closed position. This condition locks the door 72 into a closed position.

FIGS. 7, 8, 9, and 10 show detail views of one embodiment of the door hinge 76, jamb hinge 54, door lock 78 and jamb lock 64, respectively. Thus, the present invention enables a plastic door to be connected to an otherwise metal body locker, to replace a metal door.

Figure 11:
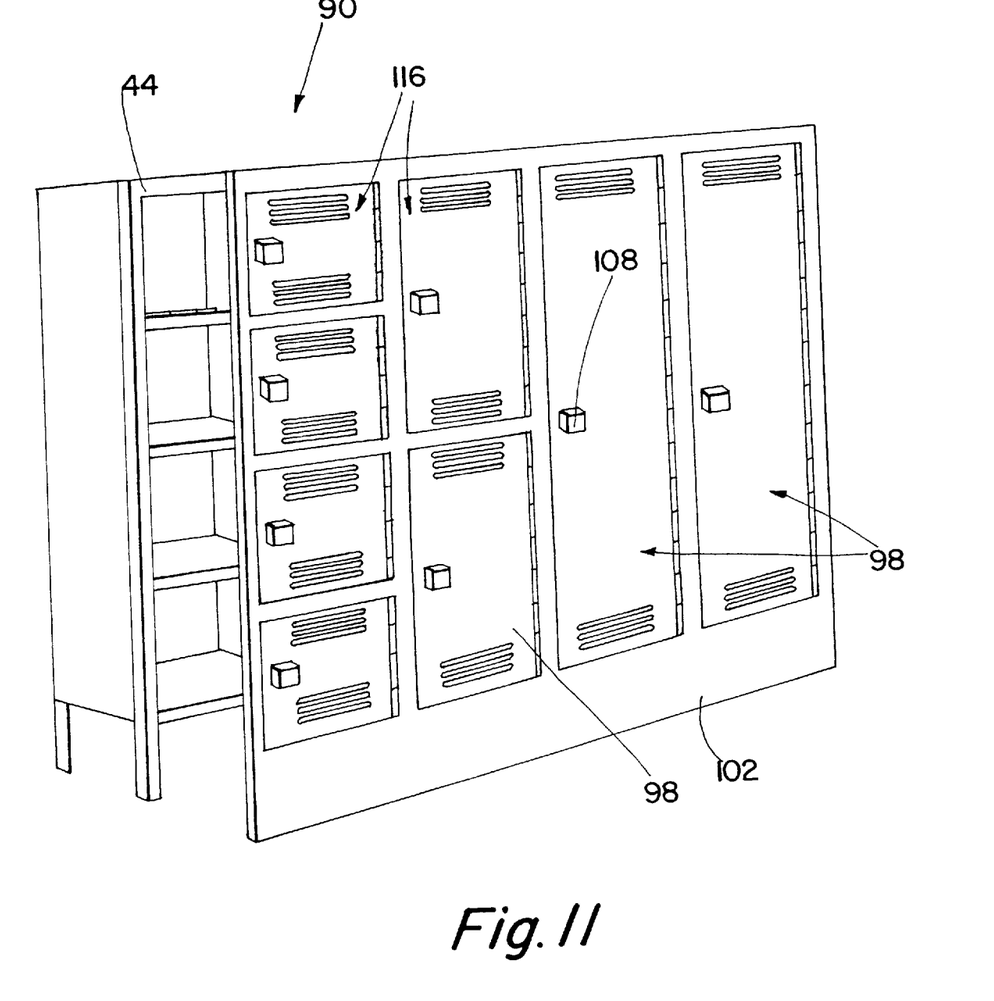
FIG. 11 is a perspective view of the preferred retrofit locker assembly of the present invention.
Figure 12:
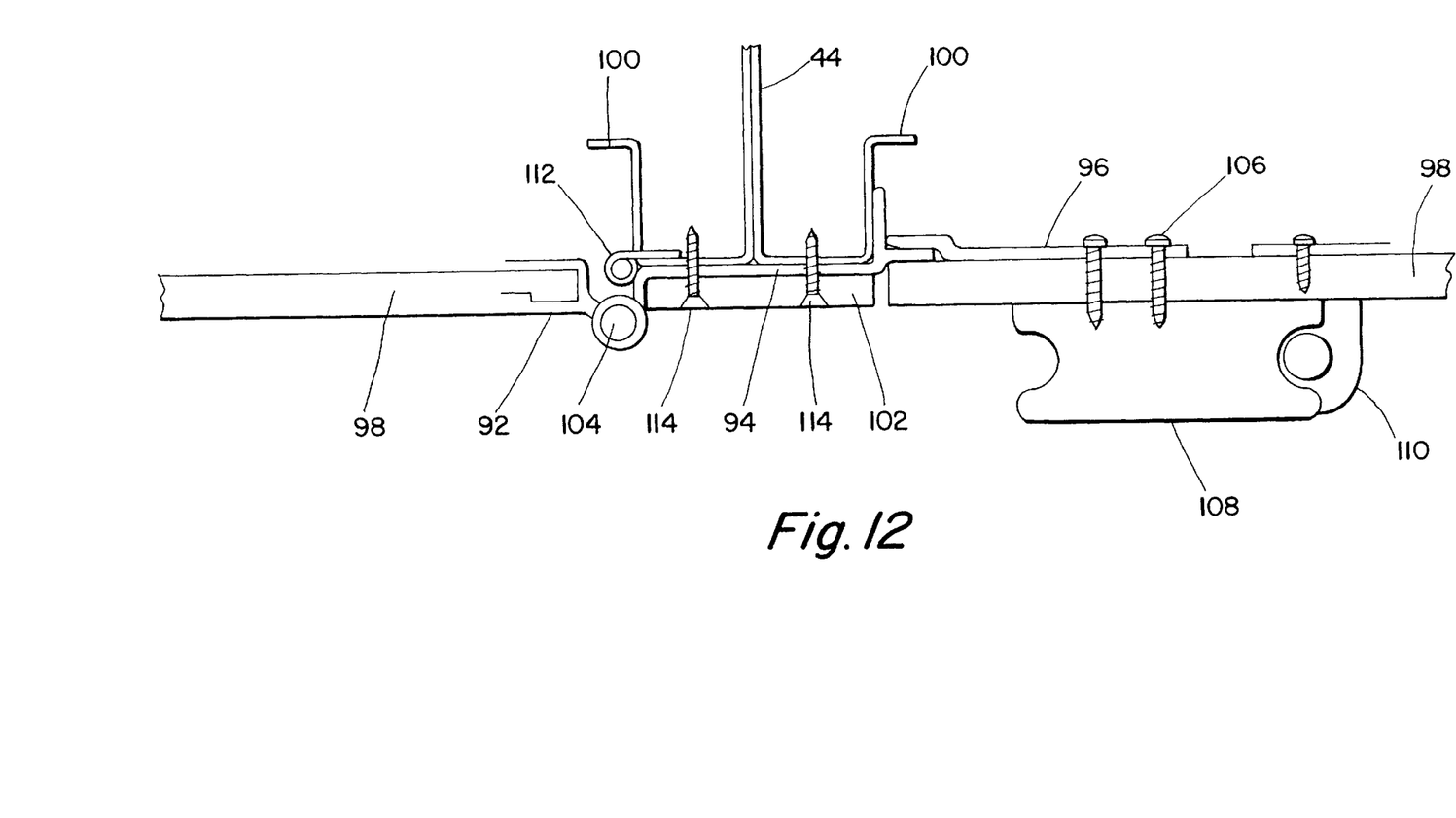
FIG. 12 is a top plan view of the preferred retrofit locker assembly of the present invention.
Figure 13:
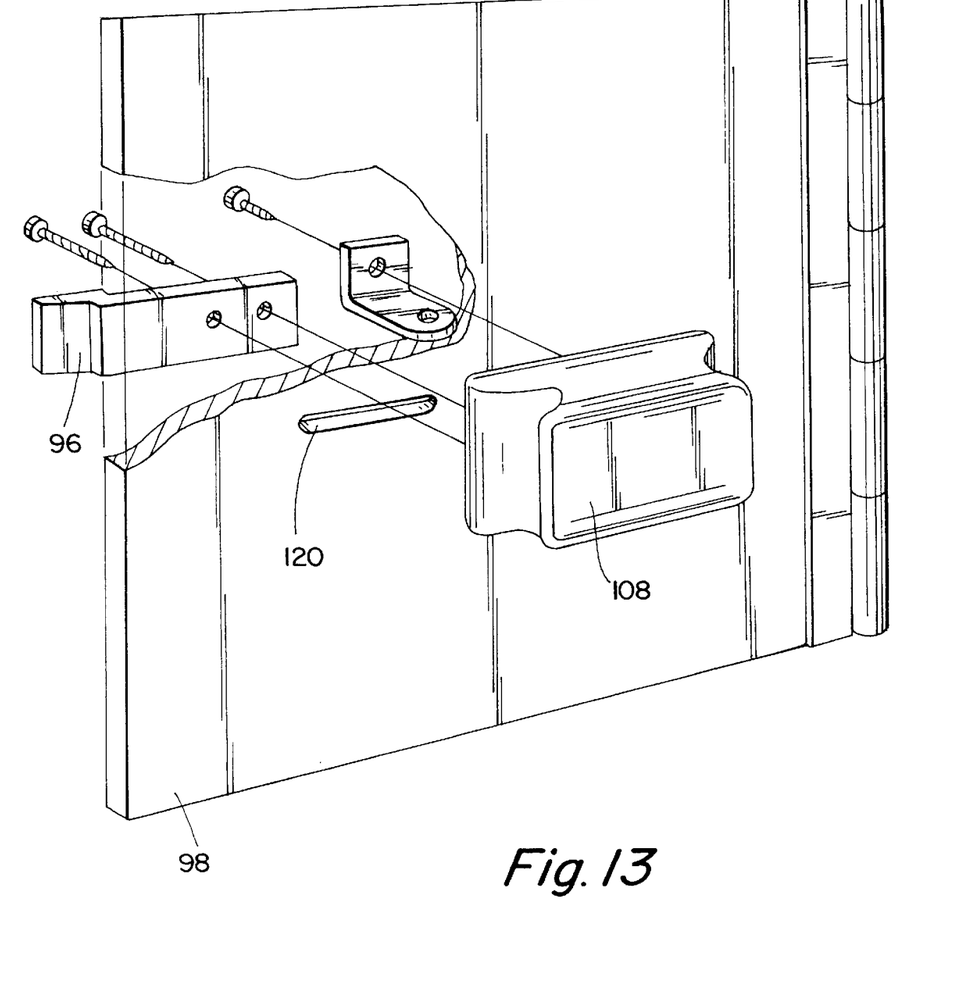
FIG. 13 is an exploded view of a preferred embodiment of the latching means and handle of the present invention.

As discussed above, FIGS. 1–10 illustrate one embodiment of the locker assembly of the present invention. FIGS. 11–13 illustrate a preferred embodiment of the retrofit locker assembly 90 of the present invention which may be attached to an existing locker system 44 as one unit. The retrofit locker assembly of FIGS. 11–13 is preferably comprised of a sheet of a predetermined material 102 (preferably non-metallic), a door hinge profile 92, a jamb hinge profile 94, a latch 96, and a door panel 98.

It is desirable to have a retrofit locker assembly which may be expeditiously connected, on-site, to an existing locker frame (or jambs 100). Accordingly, the retrofit locker assembly, as illustrated in FIGS. 11–13, may be assembled as one unit in an off-site plant, delivered to the on-site location, and attached to the existing locker frame as one unit. This reduces the time it takes for assembly of the locker assembly on-site. Additionally, constructing the retrofit locker assembly in a factory environment allows for quality controlled assembly which results in a high quality, consistent, construction.

Again, the components of the retrofit locker assembly are preferably formed from a durable, non-metallic, material such as plastic. It is preferred that the door panels 98 be fabricated from a sheet 102 of high impact, high density, polyethylene material.

The retrofit locker assembly of FIGS. 11–13 is preferably constructed by:

1.) fabricating and cutting the door panels 98 from a sheet 102 of high impact, high density, polyethylene material;

2.) door hinge profile 92, a jamb hinge profile 94, and locking (latching) assemblies 96 are assembled;

3.) the door panels 98 are placed into their original places in the sheet 102 and hinge pins 104 are inserted for securing the door panels 98; and 4.) the completed retrofit assembly is shipped as one unit and attached to the existing locker frame.

As illustrated in FIG. 12, the door panels 98 are secured to the door hinge profile 92. The door hinge profile 92 is pivotally attached to the jamb hinge profile 94 via the hinge pin 104. A latch 96, preferably an extruded aluminum latch, is secured to the door panels 98 via fastening means 106, e.g. screws. A handle 108 is attached to the exterior of the door panels 98. The handle 108 preferably has a stainless steel locking pin 110.

It is preferred that the retrofit locker assembly attach to an existing locker frame 44. The assembly of the present invention accommodates and fits over an existing door hinge 112 of the existing locker frame 44. Fastening means 114, e.g. screws, are also preferably used to secure the jamb hinge profile 94 to the existing steel locker frame 44.

The retrofit locker assemblies of FIGS. 11–13 may be conformed to retrofit various locker dimensions. By varying the size of the sheet 102, the door panels 98, and the hinge assemblies 92 and 94, retrofit assemblies of varying dimensions and forms may be constructed.

In summary, the retrofit locker assembly as shown in FIGS. 11–12 is constructed by: fabricating door panels 98 of predetermined size; attaching door hinges 92 to the door panels 98; pivotally securing the door hinges 92 in relation to a sheet 102 of predetermined material, where the sheet 102 of predetermined material has openings 116 to mate (fit) with the door panels 98 of predetermined size; and securedly attaching the sheet 102 of predetermined size to the existing locker assembly as one assembled unit.

It is preferred that the door panels 98 of predetermined size are fabricated and cut from the sheet 102 of predetermined material. Accordingly, the openings 116 created by the door panels 98 define the openings 116 in the sheet 102 for replacement of the door panels 98. It is also preferred that jamb hinges 94 be secured to the sheet 102 of predetermined material and that each one of the door hinges 92 be pivotally secured to one of the jamb hinges 94. It is also preferred that a latching means 96 be attached to each of the door panels 98 for latching the door panels 96 to one of the jamb hinges 94 when the door panels 98 are in a closed and locked position. It is preferred that latching means 96 be slidably connected to each of the door panels 98 so that the latching means 96 can be used to lock and unlock the door panel 98 with respect to the jamb hinge 94 (see FIG. 13). The handle 108 is preferably connected to the latching means 96 (preferably through a slot 120) for controlling the sliding movement thereof. Additionally, it is preferred that the jamb hinges 94 be secured so as to enclose an existing hinge 112 of the existing locker assembly.

The scope of the invention is not to be considered limited by the above disclosure, and modifications are possible without departing from the spirit of the invention as evidenced by the following claims.

What is claimed is:

1. A method for retrofitting an existing locker assembly, said existing locker assembly having door openings, comprising:

providing at least one door panel of predetermined size;

attaching a door hinge to said at least one door panel;

securing said door hinge in relation to a sheet of predetermined size to form a unitary locker door retrofit assembly, said sheet of predetermined size adapted to cover the front of said existing locker assembly, said sheet having openings of predetermined size, said openings in said sheet corresponding dimensionally and spatially to at least two of said door openings of said existing locker assembly, at least one of said openings in said sheet adapted to receive said at least one door panel; and securely attaching said unitary locker door retrofit assembly to said existing locker assembly to replace at least one pre-existing door of said existing locker assembly.

2. A method according to claim 1, wherein said at least one door panel of predetermined size is fabricated and cut from said sheet of predetermined size.

3. A method according to claim 1, further comprising:

securing at least one jamb hinge to said sheet of predetermined size; and pivotally securing said door hinge to said at least one jamb hinge.

4. A method according to claim 3, further comprising:

attaching a latch to said at least one door panel for latching said at least one door panel to said at least one jamb hinge when said at least one door panel is in a closed position, said latch adapted to engage said at least one jamb hinge.

5. A method according to claim 4, further comprising:

attaching a door handle to said at least one door panel, said door handle secured to said latch to control movement of said latch.

6. A method according to claim 3 wherein said at least one jamb hinge is secured so as to enclose an existing hinge of said existing locker assembly.

7. A method according to claim 1, wherein said unitary locker door retrofit assembly is secured to said existing locker assembly via fasteners at predetermined locations.

8. A method according to claim 1, wherein said sheet of predetermined size and said at least one door panel are comprised of high impact, high density polyethylene.

9. A method for retrofitting an existing locker assembly, said existing locker assembly comprising one or more existing lockers having pre-existing doors, and door openings, comprising:

fabricating door panels of predetermined size;

attaching door hinges to said fabricated door panels;

securing said door hinges in relation to a sheet of predetermined size, said sheet of predetermined size adapted to cover the front of said existing locker assembly, said sheet of predetermined size having openings to contain said door panels of predetermined size and wherein said openings in said sheet correspond dimensionally and spatially with said door openings of said existing locker assembly;

securing jamb hinges to said sheet of predetermined size to form a unitary locker door retrofit assembly, wherein each one of said door hinges is pivotally secured to one of said jamb hinges;

attaching a latch to said door panels for engaging said jamb hinges when said door panels are in a closed position;

attaching a door handle to said door panels to control the movement of said latches;

securing said unitary locker door retrofit assembly to said existing locker assembly to replace said pre-existing doors of said existing lockers;

wherein said door panels of predetermined size are fabricated and cut from said sheet of predetermined size;

wherein said jamb hinges are secured so as to enclose an existing hinge of said existing locker assembly; and wherein said unitary locker door retrofit assembly is attached to said existing locker assembly via fasteners at predetermined locations.

10. A locker door retrofit assembly for an existing locker assembly, said existing locker assembly having door openings, said locker door retrofit assembly comprising:

a sheet of predetermined size, said sheet adapted to cover the front of said existing locker assembly, said sheet having openings of predetermined size, said openings in said sheet corresponding dimensionally and spatially to at least two of said door openings of said existing locker assembly;

at least one jamb hinge secured to said sheet of predetermined size;

at least one door hinge, said at least one door hinge pivotally attached to said at least one jamb hinge; and at least one door panel, said at least one door panel secured to said at least one door hinge, said at least one door panel configured to fit within at least one of said openings of said sheet of predetermined size;

wherein said sheet of predetermined size, said at least one jamb hinge, said at least one door hinge, and said at least one door panel form a unitary locker door retrofit assembly, and wherein said unitary locker door retrofit assembly is adapted to be attached to said existing locker assembly to replace at least one pre-existing door of said existing locker assembly.

11. A locker door retrofit assembly for an existing locker assembly, said existing locker assembly including at least one existing locker having at least one door opening, said locker door retrofit assembly comprising:

a sheet of predetermined size, said sheet adapted to cover the front of said existing locker assembly, said sheet having at least one opening of predetermined size, said at least one opening in said sheet corresponding dimensionally and spatially to said at least one door opening of said existing locker assembly;

at least one jamb hinge secured to said sheet of predetermined size;

at least one door hinge, said at least one door hinge pivotally attached to said at least one jamb hinge;

at least one door panel, said at least one door panel secured to said at least one door hinge, said at least one door panel configured to fit within said at least one opening of said sheet of predetermined size; and at least one latch slidably attached to said at least one door panel, said at least one latch releasably engaging said at least one jamb hinge when in the locked position;

wherein said sheet of predetermined size, said at least one jamb hinge, said at least one door hinge, and said at least one door panel form a unitary locker door retrofit assembly, and wherein said unitary locker door retrofit assembly is adapted to be attached to said existing locker assembly to replace at least one preexisting door of said existing locker assembly.

12. A locker door retrofit assembly according to claim 11, wherein said at least one jamb hinge is adapted to enclose an existing hinge of said existing locker assembly.

13. A locker door retrofit assembly according to claim 11, further comprising:

at least one handle secured to said at least one latch to control the sliding movement of said at least one latch.

14. A locker door retrofit assembly according to claim 10, wherein said unitary locker door retrofit assembly is attached to said existing locker by screws located at predetermined locations.

15. A locker door retrofit assembly according to claim 10, wherein said sheet and said door panel are comprised of high impact, high density polyethylene.

16. A locker door retrofit assembly according to claim 10, further comprising:

at least one latch slidably attached to said at least one door panel, said at least one latch releasably engaging said at least one jamb hinge when in the locked position.

17. A locker door retrofit assembly according to claim 16, further comprising:

at least one handle secured to said at least one latch to control the sliding movement of said at least one latch.

18. A locker door retrofit assembly according to claim 10, wherein said at least one jamb hinge is adapted to enclose an existing hinge of said existing locker assembly.

19. A method for retrofitting an existing locker assembly, said existing locker assembly comprising one or more existing lockers having one or more pre-existing doors and door openings, comprising:

providing at least one door panel of predetermined size;

providing a sheet of predetermined size adapted to cover the front of said existing locker assembly, said sheet of predetermined size having at least one opening to receive said at least one door panel of predetermined size, said at least one opening in said sheet corresponding dimensionally and spatially to said one or more door openings of said existing locker assembly;

attaching a door hinge to said at least one door panel;

securing at least one jamb hinge to said sheet of predetermined size;

pivotally securing said door hinge to said at least one jamb hinge to form a unitary locker door retrofit assembly;

attaching a latch to said at least one door panel for latching said at least one door panel to said at least one jamb hinge when said at least one door panel is in a closed position, said latch adapted to engage said at least one jamb hinge; and securely attaching said unitary locker door retrofit assembly to said existing locker assembly to replace said one or more pre-existing doors of said existing lockers.

20. A method according to claim 19, wherein said at least one jamb hinge is secured so as to enclose an existing hinge of said existing locker assembly.

21. A method according to claim 19, further comprising:

attaching a door handle to said at least one door panel, said door handle secured to said latch to control movement of said latch.

* * * * *